Oct. 20, 1936.   E. ZEUTHEN   2,058,049
VEHICLE TAIL GATE
Original Filed Sept. 20, 1932   2 Sheets-Sheet 2
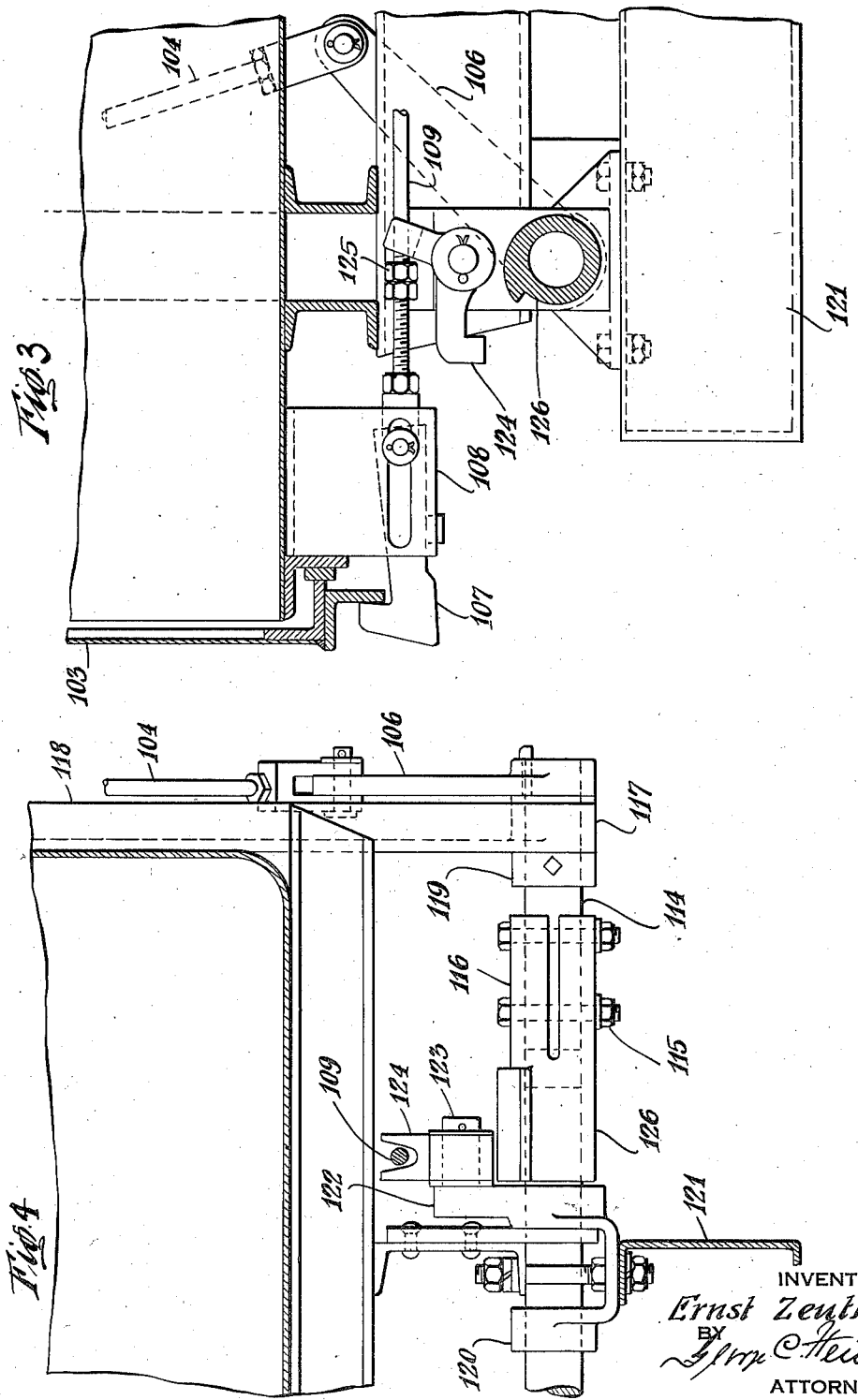
INVENTOR
Ernst Zeuthen
BY
ATTORNEY Patented Oct. 20, 1936

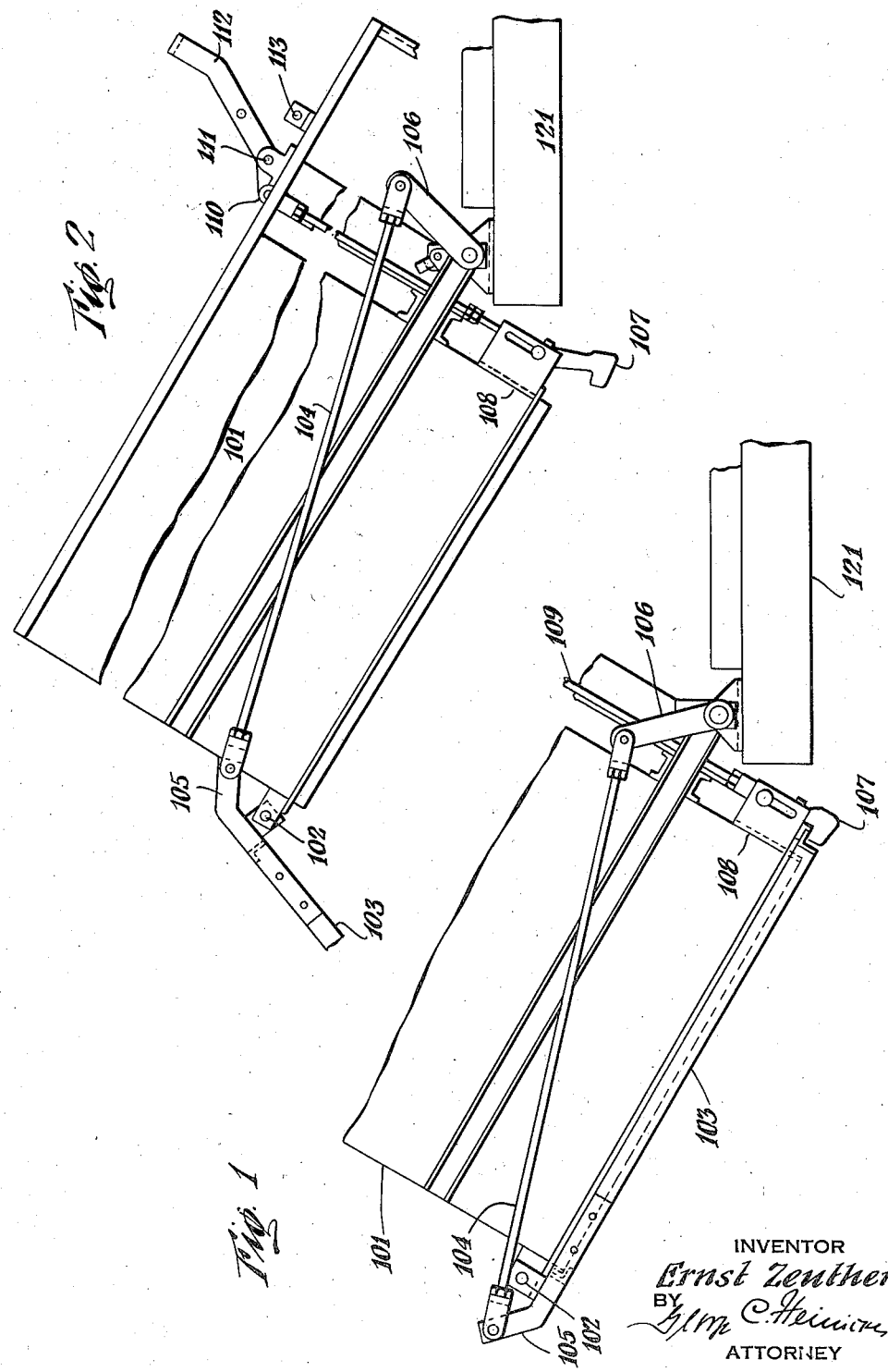

2,058,049

UNITED STATES PATENT OFFICE 2,058,049

VEHICLE TAIL GATE

Ernst Zeuthen, Brooklyn, N. Y.

Original application September 20, 1932, Serial No. 633,953. Divided and this application March 22, 1934, Serial No. 716,777

3 Claims. (Cl. 298—23)

This invention relates to improvements in refuse loaders, particularly hydraulically operated loaders as for instance described and shown in my Patent No. 1,953,579, issued April 3, 1934, of which this application is a division.

It is the principal object of my invention to provide the loaders with novel and improved means for shifting the load which has been filled in at the front end and with means for dumping the load, including means for optionally opening the tail gate through which the refuse is dumped, and allowing the tail gate in its open position to readily increase its angle in relation to the truck body when dragged over obstacles as for instance ash heaps, by the intermediary of lever operated pawl and cam arrangements.

Another object of my invention is to provide a tail gate operating mechanism particularly for use with dumping vehicle bodies including a latch engaging the tail gate operating lever so that, when the tail gate is unlocked, the lever will retain its position in relation to the stationary part of the chassis while the body is being tilted so that the tail gate is made to increase and vary its angle in relation to the body still further.

A further object of my invention is the provision of a tail gate operating mechanism for refuse or other vehicles of a similar type which is of simple and therefore inexpensive in construction, yet durable and highly efficient in operation.

These and other objects and advantages of my invention will become more fully known as the description thereof proceeds and will then be more specifically defined in the appended claims.

In the accompanying drawings forming a material part of this disclosure:

Fig. 1 is a fragmentary elevation of a truck body equipped with a tail gate operating mechanism according to my invention with the body tilted and the tail gate closed.

Fig. 2 is a fragmentary elevation of a truck body equipped with a tail gate operating mechanism, Figure 1, with the body tilted and the tail gate open.

Fig. 3 is a fragmentary side elevation of the tail gate operating mechanism on an enlarged scale.

Fig. 4 is a sectional end elevation of the presentation shown in Fig. 3.

As shown on the drawings, the truck body 101 has pivoted at 102 a gate 103 adapted to be opened, for unloading the truck by dumping its contents through the rear end, by means of a pull rod 104, on each side of the truck body, pivotally connected at its upper end to cantilevers 105 which are rigidly attached to the tail gate 103, while the lower end of this pull rod 104 is pivotally connected to the operating lever 106.

The tail gate is normally held locked by the well-known standard mechanism including hook 107, guide 108, pull rod 109, lever 110, shaft 111, handle 112 and locking bolt 113.

The operating lever 106 is keyed to the shaft 114 to which is bolted by means of bolts 115 the cam-sleeve 126 and this assembly is pivotally supported by an extension of the body hinge shaft 116 and a bearing 117 welded to the body reinforcing channel extension 118.

A stop ring 119 prevents the axial displacement of the shaft 114.

The body hinge 120 which facilitates the tilting of the body in relation to the chassis frame 121, is provided with a lug 122 having a shaft 123 on which the pawl 124 is pivoted.

This arrangement is provided symmetrically on each side of the truck.

The pull rod 109 is provided with a running thread of sufficient length to allow the proper adjustment of the location of nut and lock nut 125, which engage the vertical extension of pawl 124 through whose forked prongs the pull rod 109 passes.

Suitable standard washers and cotterpins complete this assembly.

Thus it will be clear that it has been made possible to distribute the load of refuse, filled in at the front end of the truck body only, by tilting the body with the tail gate locked, as the pawl 124 remains raised until the cam on the sleeve 116 has passed the engagement position.

The whole assembly of body, tail gate, pull rod 104, operating lever 106 and cam sleeve 126 moves as a unit with the body hinge shaft 114 as a fulcrum, as illustrated in Fig. 1.

It will furthermore be clear that when the tail gate is unlocked for the purpose of discharging the load, the pawl 124 is, by the axial displacement of the nuts 125, allowed to engage the cam on the sleeve 126 so that the operating lever 106 during the tilting operation, remains stationary in relation to the chassis frame 121, and consequently opens the tail gate as illustrated in Fig. 2.

Should the open tail gate be dragged over an obstructing heap of discharged refuse, and thus forced wider open, increasing its angle in relation to the body, the operating lever 106 and cam sleeve 126 are free to turn in the required direction, being a clock-wise direction on Fig. 3.

It will be clear, that by this mechanism, damage to the truck and tail gate and its operating mechanism by shocks or oscillations to which the tail gate may be subjected by the increased level of the discharged load over which the tail gate is dragged as the truck is driven ahead, is positively avoided.

It will be understood that I have described the preferred form of my invention as one example only of the many possible ways to practically construct the invention and that I may make such changes therein as come within the scope of the appended claims without departure from the spirit of my invention.

Having thus described my invention, what I claim as new, and desire to secure by letters patent is:

1. In a locking device for the tail gates of dumping vehicles having a chassis and tiltable body mounted thereon, an operating lever for the tail gate, a pull rod having a threaded part, a nut adjustable on said threaded part, and a lock nut to lock said adjustable nut in any of its adjusted positions, a forked pawl between the prongs of which said rod passes, a sleeve on the spindle of said operating lever, a cam on said sleeve adapted to be engaged by said pawl to keep the operating lever stationary during the dumping of the vehicle according to the adjustment of said nuts.

2. In a dumping vehicle including its chassis and tiltable body mounted thereon, a body hinge shaft, a tail gate locking device, operating means for the tail gate, a shaft for said operating means, a sleeve on said shaft, and a cam on said sleeve means to unlock said tail gate from the front end of the chassis, a fulcrum for the tail gate operating means, an extended shaft formed at said fulcrum, concentric with the body hinge shaft, levers attached rigidly to said extended shafts, and a pawl operated by the tail gate unlocking means to engage the cam on said sleeve, making said levers retain their position in relation to the stationary part of the chassis while the body is being tilted.

3. In a tail gate operating mechanism for mechanically operated dumping vehicles including their chassis and tiltable bodies, body hinge shafts, hinge pin extensions forming an integral part of the body hinge shafts, sleeves on said extensions, cams on said sleeves, said extensions serving as pivotal supports for said cam sleeves, levers rigidly attached to said cam sleeves, and pawls for optionally engaging said sleeves, retaining their position to the stationary part of the chassis, permitting the tail gate to freely change its angle relative to the body when dragged over a heaping load discharged by the loader.

ERNST ZEUTHEN.